3,374,262
PRODUCTION OF O-AMINOBENZONITRILES BY THERMAL DECOMPOSITION OF ISATIN-β-OXIMES
Matthias Seefelder, Ludwigshafen (Rhine), and Herbert Armbrust, Frankenthal, Pfalz, Germany, assignors to Badische Anilin- & Soda-Fabrik Aktiengesellschaft, Ludwigshafen (Rhine), Germany
No Drawing. Filed June 11, 1965, Ser. No. 463,347
Claims priority, application Germany, June 20, 1964, B 77,337
5 Claims. (Cl. 260—465)

This invention relates to a process for the production of o-aminobenzonitriles and more particularly to an improvement in a prior art method of production.

It is known that o-aminobenzonitriles are obtained in the thermal decomposition of isatin-β-oximes at atmospheric pressure. Since in order to obtain yields which to some extent are satisfactory it is necessary to react only small amounts of isatin-β-oximes, however, this method is unsuitable for operation on an industrial scale.

It is an object of the invention to provide a new and improved process for the manufacture of o-aminobenzonitriles from isatin-β-oximes. It is another object of the invention to provide a process for the production of o-aminobenzonitriles which can be carried out on an industrial scale. It is a further object of the invention to provide a process for the production of o-aminobenzonitriles which gives better yields than the process of the prior art.

We have found that o-aminobenzonitriles having the general formula:

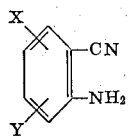

in which X denotes a hydrogen atom, an alkyl radical having one to four carbon atoms or a halogen atom and Y denotes a hydrogen atom, an alkyl radical having one to four carbon atoms or a halogen atom, may be prepared in a simple way on an industrial scale by heating isatin-β-oximes having the general formula:

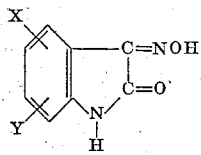

in which X and Y have the above meanings, by carrying out the heating of the β-isatinoximes under subatmospheric pressure and in the presence of inert solvents or diluents whose boiling point is not lower than the boiling point of the o-aminobenzonitriles formed, under such temperature and pressure conditions that the o-aminobenzonitrile formed distills off immediately.

Not only is this process capable of being carried out on an industrial scale, but surprisingly it leads to a considerable increase in yield as compared with the prior art batchwise methods.

Examples of β-isatinoximes which may be used are:
isatin-β-oxime, 5-chloroisatin-β-oxime,
5-methylisatin-β-oxime, 7-ethylisatin-β-oxime,
5,7-dibromoisatin-β-oxime, 4,6-dichloroisatin-β-oxime,
4-chloroisatin-β-oxime, 4-chloro-5-bromoisatin-β-oxime,
5-fluoroisatin-β-oxime, 5-isodoisatin-β-oxime,
7-bromo-5-methylisatin-β-oxime and 5,7-dimethylisatin-β-oxime.

Examples of suitable solvents or suspension agents are phthalic esters having boiling points of more than 310° C. but preferably not above 450° C., for example the phthalic esters of butanol, 2-ethylhexanol, glycol monobutyl ether, and oligomeric ether alcohols from olefine oxides having boiling points above 310° C., the molecular weight of the ether alcohols not exceeding 1000, particularly oligomeric ethylene oxides, as for example hexameric ethylene oxide, nonameric ethylene oxide, and the commercial mixtures of such oligomeric ethylene oxides.

Decomposition temperatures for isatin oximes lie in the range of from 200° to 400° C., preferably in the range of from 220° to 300° C., and the initial pressures amount to 0.05 to 200 mm. Hg, preferably 10 to 120 mm. Hg. The most favorable decomposition temperatures and pressures depend on the constitution of the β-isatinoximes.

The process may be carried out for example as follows:

The β-isatinoxime concerned is dissolved or suspended in the solvent or diluent. The ratio by weight of isatinoxime to solvent or diluent is preferably less than 1:5. The solution or suspension is passed to a vaporizer, preferably a one-pass evaporator, particularly a falling-film evaporator, which is heated at least to the decomposition temperature of the β-isatinoxime. The thermal decomposition is preferably carried out in a thin layer having a thickness of 0.05 to 20 mm., preferably 0.1 to 4 mm., particularly 0.1 to 0.5 mm. The carbon dioxide and aminobenzonitrile formed escape and the aminobenzonitrile is condensed. The solvent remaining in the evaporator or leaving a one-pass evaporator may be immediately reused without purification. The process may however also be carried out for example by placing the solvent or diluent in a bubble evaporator, heating it at least to the decomposition temperature of the isatin-β-oxime, and introducing the β-isatinoxime in portions, the rate of introduction being such that the concentration of the undecomposed isatinoxime in the solvent advantageously does not exceed 10%, preferably does not exceed 3%, although this limit is not critical and may be exceeded at least for a short time.

The o-aminobenzonitriles obtained by condensation are already very pure and in many cases they may therefore be used immediately for further reactions; they may however be further purified, for example by distillation under subatmospheric pressure.

o-Aminobenzonitriles are intermediates for dyes, pesticides and pharmaceuticals.

The following examples will further illustrate this invention.

*Example 1*

A suspension of 100 parts of 5-chloroisatin-β-oxime in 400 parts of diethylhexyl phthalate is supplied during the course of eighty minutes to a molecular distillation apparatus whose distilling flask is heated to 230° to 250° C. and is under a pressure of 15 to 25 mm. Hg. The 2-amino-5-chlorobenzonitrile formed is condensed.

By distilling and rectifying the condensate, 58.2 parts of pure 2-amino-5-chlorobenzonitrile having a melting point of 96° to 97° C. is obtained, equivalent to 75% of the theory.

*Example 2*

686 parts of isatin-β-oxime is suspended in 2400 parts of nonaethylene glycol and supplied during the course of 2½ hours to a falling film evaporator which is evacuated with a water jet pump and is heated to 275° C. A pressure of 30 to 40 mm. Hg is thus set up. The distillate from the evaporator is freed from entrained impurities by distillation.

400 parts of 98% o-aminobenzonitrile having a boiling point of 125° to 130° C. at 8 mm. Hg is obtained, equivalent to 80% of the theory.

*Example 3*

The procedure of Example 2 is followed but a suspension of 690 parts of isatin-β-oxime in 1900 parts of the evaporator residue from Example 2 is used.

428 parts of 98% o-aminobenzonitrile is obtained, equivalent to 85% of the theory.

*Example 4*

820 parts of a suspension of 230 parts of 5-methylisatin-β-oxime in diethylhexyl phthalate is subjected to pyrolysis as described in Example 1 for three hours. 130 parts of 97% 5-methyl-2-aminobenzonitrile (boiling point at 13 mm. Hg 150° to 152° C.; melting point 59° to 60° C.), equivalent to 75.4% of the theory, is obtained by distillation and rectification.

We claim:

1. Process for the production of o-aminobenzonitriles having the general formula

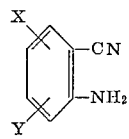

in which X and Y denote a member of the group consisting of a hydrogen atom, a halogen atom and an alkyl group having 1 to 4 carbon atoms which process comprises heating an isatin-β-oxime having the general formula

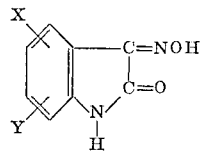

in which X and Y have the above meanings under subatmospheric pressure to at least 200° C. in the presence of an inert solvent having a boiling point higher than the boiling point of the aminobenzonitrile to be formed, under such conditions of temperature and pressure that the o-aminobenzonitrile distills off immediately after formation.

2. Process for the production of o-aminobenzonitriles having the general formula

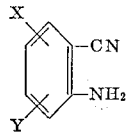

in which X and Y denote a member of the group consisting of a hydrogen atom, a halogen atom and an alkyl group having 1 to 4 carbon atoms which process comprises heating an isatin-β-oxime having the general formula

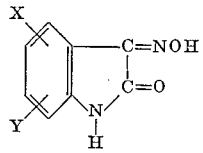

in which X and Y have the above meanings, under subatmospheric pressure to at least 200° C. in the presence of a phthalic acid ester having a boiling point between 310° C. and 450° C. (under normal pressure), under such conditions of temperature and pressure that the o-aminobenzonitrile distills off immediately after formation.

3. Process for the production of o-aminobenzonitriles having the general formula

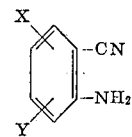

in which X and X denote a member of the group consisting of a hydrogen atom, a halogen atom and an alkyl group having 1 to 4 carbon atoms which process comprises heating an isatin-β-oxime having the general formula

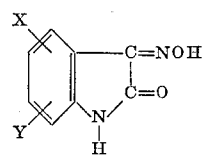

in which X and Y have the above meanings, under subatmospheric pressure to at least 200° C. in the presence of an oligomer ethylene oxide having a boiling point of at least 310° C. and a molecular weight of not more than 1000, under such conditions of temperature and pressure that the o-aminobenzonitrile distills off immediately after formation.

4. Process for the production of o-aminobenzonitriles having the general formula

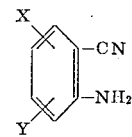

in which X and Y denote a member of the group consisting of a hydrogen atom, a halogen atom and an alkyl group having 1 to 4 carbon atoms which process comprises heating an isatin-β-oxime having the general formula

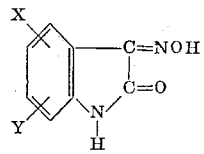

in which X and Y have the above meanings, under reduced pressure to at least 200° C. in a thin layer of 0.05 to 20 mm. in the presence of an inert solvent having a boiling point higher than the boiling point of the aminobenzonitrile to be formed, under such conditions of temperature and pressure that the o-aminobenzonitrile distills off immediately after formation.

5. A process as claimed in claim 4 in which the heating of the isatin-β-oxime is caried out in a continuous manner by passing the isatin-β-oxime in the inert solvent through a heating zone.

References Cited

Helvetica Chimica Acta, vol. 42, pp. 872–3.
Journal of the Chemical Society (of London), 1959, pp. 1633–4.
La Gazzetta Chimica Italiana, 84, pp. 157–168 (1954).

CHARLES B. PARKER, *Primary Examiner.*

S. T. LAWRENCE III, *Assistant Examiner.*